United States Patent [19]

Wolf

[11] Patent Number: 4,477,761
[45] Date of Patent: Oct. 16, 1984

[54] METHOD OF AND SYSTEM FOR MINIMIZING CURRENT CONSUMPTION OF ONE OR MORE A-C MOTORS DRIVING A VARIABLE LOAD

[75] Inventor: Horst Wolf, Albershausen, Fed. Rep. of Germany

[73] Assignee: Zinser Textilmaschinen GmbH, Ebersbach/Fils, Fed. Rep. of Germany

[21] Appl. No.: 447,998

[22] Filed: Dec. 8, 1982

[30] Foreign Application Priority Data

Dec. 9, 1981 [DE] Fed. Rep. of Germany ....... 3148794

[51] Int. Cl.$^3$ ............................................. H02P 5/40
[52] U.S. Cl. .................................... 318/800; 318/813; 318/814
[58] Field of Search .................. 318/317, 800–811, 318/798, 727, 729, 812–815, 508–513, 344; 323/256, 257, 341

[56] References Cited

U.S. PATENT DOCUMENTS

| | | | |
|---|---|---|---|
| 4,052,648 | 10/1977 | Nola | 318/805 |
| 4,055,795 | 10/1977 | Mathien | 318/729 |
| 4,160,940 | 7/1979 | Wolf | 318/803 |
| 4,186,334 | 1/1980 | Hivata | 318/805 |
| 4,344,025 | 8/1982 | Okuyama et al. | 318/729 |
| 4,361,792 | 11/1982 | Davis | 318/729 |

Primary Examiner—J. V. Truhe
Assistant Examiner—Arthur G. Evans
Attorney, Agent, or Firm—Karl F. Ross

[57] ABSTRACT

In order to minimize the current consumption of an alternating-current motor of the induction or the synchronous type (or possibly a plurality of such motors connected in parallel) driving a variable load, a sensor coupled to a supply line of the motor detects the occurrence of a significant change in its operating current and determines the sense of that change. A controller responsive to signals from the sensor then reduces the supply voltage by an incremental or decremental step and, if the sensor detects a resulting decrease in amperage, continues with one or more similar steps until the current levels off. If the initial voltage modification causes the current to rise, the controller progressively changes the supply voltage in the opposite sense until the amperage reaches a minimum. In the case of an induction motor whose rotor speed is controllable by variations in slip frequency with the aid of an arithmetic unit responsive to a tachometric signal and to voltage feedback from the input of its stator, the desired current reduction is achieved by an incrementation or decrementation of the feedback voltage.

24 Claims, 13 Drawing Figures

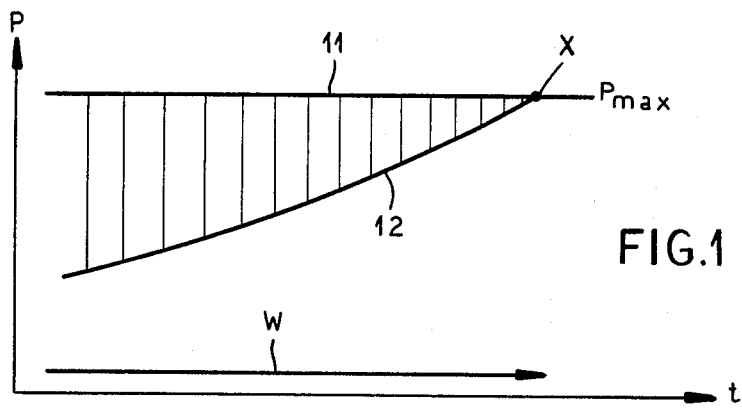
FIG.1
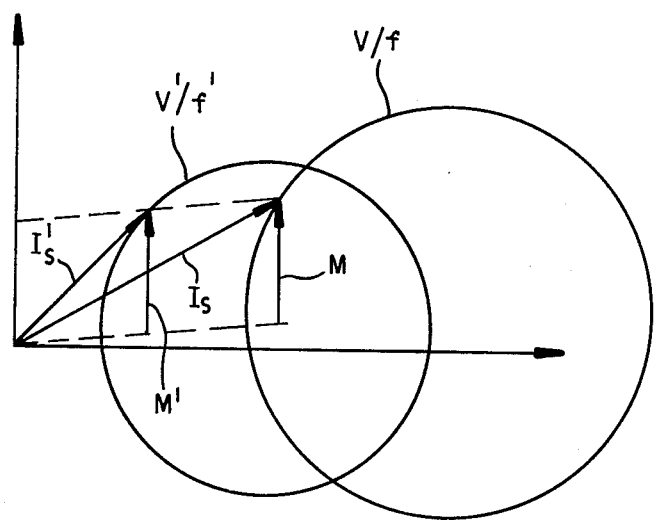
FIG.2
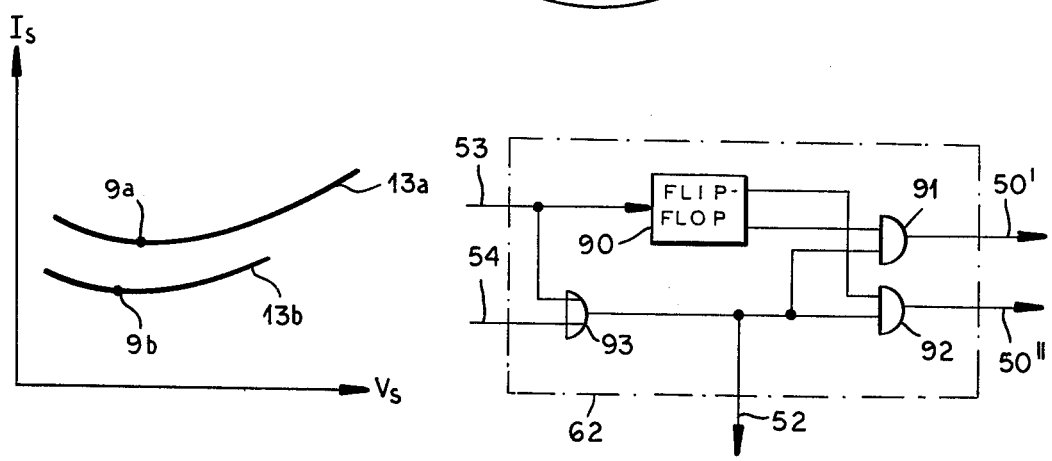
FIG.3
FIG.11

METHOD OF AND SYSTEM FOR MINIMIZING CURRENT CONSUMPTION OF ONE OR MORE A-C MOTORS DRIVING A VARIABLE LOAD

FIELD OF THE INVENTION

My present invention relates to a method of and a system for saving electrical energy by minimizing the current consumption of one or more alternating-current motors driving a variable load.

BACKGROUND OF THE INVENTION

In many instances, e.g. in the operation of textile machinery, a load driven by an a-c motor of the induction or possibly the synchronous type changes in a not always predictable manner. A rotating spindle carrying a take-up spool or cop, for example, will require a progressively larger torque as the growing body of yarn wound thereon encounters ever-increasing air resistance. On the other hand, an unforeseen occurrence such as the break of a transmission shaft could sharply lower the load seen by a drive motor.

In my commonly assigned U.S. Pat. No. 4,160,940 I have disclosed and claimed a method of and a system for controlling the operation of a squirrel-cage or other induction motor with avoidance of harmful voltage transients and with stabilization against pull-out. The system described in that prior patent includes a frequency changer with cascaded a-c/d-c and d-c/a-c converters forming part of a polyphase power line for the energization of the stator of such a motor whose rotor is coupled with a tachometer or speed sensor feeding back an error signal when the rotor speed deviates from a selected value. A compensatory adjustment of the magnitude of the stator current is carried out in response to that error signal by a control unit including the a-c/d-c converter of the frequency changer; this control unit, however, operates with a certain lag due to the presence of reactances such as a current-stabilizing choke inserted in a direct-current path between the two converters. The error signal is also delivered to a feedback circuit of relatively small time constant controlling a pulse generator which, by acting upon the d-c/a-c converter, modifies the frequency of the alternating voltage supplied to the input of the stator and thus the speed of the rotating electromagnetic field generated therein; this modifies the slip of the rotor relative to that field and with it the torque developed by the motor before any significant change in the stator current. Contrary to an earlier system referred to in that prior patent, the frequency change caused by this fast feedback temporarily reduces the slip to stabilize the motor against pull-out in the event of a load increase. When the slow-acting control unit takes effect after any load variation, the stator current assumes a new value tending to let the motor operate at or near a point of maximum torque.

As further explained in my prior patent, the point of maximum torque occurs at different slip frequencies depending on the magnitude of the stator current. As that current increases, the point of maximum torque and thus the optimum operating point of such an induction motor shifts toward the higher slip frequencies. A load of given magnitude, therefore, can be driven either at a lower slip frequency with a higher current or at a higher slip frequency with a lower current. The patented system does not include any means for determining wether the current drawn by the stator after restabilization has in fact the lowest value compatible with the existing load and the selected rotor speed.

A somewhat analogous situation exists in the case of a synchronous motor where, within a permissible range, a minimization of the operating current required to drive a given load is possible by changes in the supply voltage with resulting adjustment of the phase lag between the rotor and stator fields.

Commonly owned German published specification No. 28 17 163 describes a method of and a system for so operating an induction motor, driving a spindle of a textile machine, that variations in load cause only a minimum change in rotor speed. The described procedure involves a monitoring of speed changes resulting from predetermined load incrementations at different supply voltages. Thus the selected optimum voltage is that with which the incrementation of the load causes the least speed variation.

Another commonly owned published German specification, No. 29 39 090, describes a method of and a system for controlling the rotor speed of several parallel-connected induction motors in a manner designed to maintain an optimum power factor. This is accomplished by varying, in a predetermined manner, the ratio of supply voltage to stator frequency with changes in that frequency or in the load. As pointed out in the latter publication, the largest power factor does not usually coincide with the steepest slope of the torque/speed characteristic (which is the parameter to be maximized according to German specification No. 28 17 163) so that a compromise between the two values may be desirable.

Neither of these two German publications directly addresses the problem of minimizing the consumption of electrical energy in the operation of an induction motor by a reduction of its stator current. That problem arises especially when a motor designed to drive loads of widely varying magnitude—or a group of substantially identical motors operating in parallel—is used only at a fraction of its capacity in driving a smaller load, with resulting loss of efficiency.

OBJECTS OF THE INVENTION

The general object of my present invention, therefore, is to provide a method of and means for more efficiently operating an alternating-current motor of the induction or the synchronous type under conditions underutilizing its capacity.

A more particular object is to improve the efficiency of an underutilized induction motor designed to operate at a constant rotor speed.

SUMMARY OF THE INVENTION

According to the method aspects of my invention, the current flow in the supply circuit of an a-c motor—i.e. in a power line connected across its stator—is monitored to detect changes due to significant load variations. From time to time, either at periodic intervals or in response to such a load variation, the RMS value of the alternating input voltage generating the rotating electromagnetic stator field is modified by algebraically summing therewith a voltage increment of a given sign so as either to increase or to decrease that RMS value (a voltage increment of negative sign, of course, may also be referred to as a voltage decrement). This voltage modification results in a current change in the supply circuit which is observed, preferably by electronic means, to determine whether the current has grown larger or smaller. If the amperage has increased, this is taken as an indication that the incremental voltage modification was of the wrong sign since it did not tend to reduce the current to a minimum. Such a current reduction is then brought abought by one or more additional voltage-modifying steps with increments of the proper sign until it is noted that the magnitude of the diminishing current has substantially leveled off, i.e. that it fails to change significantly in response to such modification. Of course, if the first voltage-modifying step already causes a lowering of the amperage, no change in sign will be necessary.

In some instances, particularly when the initial incrementation is performed other than in response to a detected load variation, the initial incrementation step may produce no significant change in stator current. This will generally be interpreted as an indication that the motor already draws the minimum current compatible with its rotor speed and with the existing load so that the modification of its input voltage may be temporarily halted.

If the load is normally variable in a predetermined sense only, the sign of the first voltage increment ought to be always so chosen as to cause a current change compensating the expected load variation. In the aforementioned case of a spindle carrying a progressively increasing yarn body, for example, the first algebraic summation will be an addition in order to increase the input voltage and with it the stator current. If the voltage increment used for this first summation is made large enough, all subsequent voltage-modifying steps (of smaller magnitude) may proceed in the opposite sense to establish the desired current minimum.

In the case of an induction motor whose rotor speed is controlled by changes in the frequency of the input voltage modifying its slip, as described in my above-discussed prior U.S. Pat. No. 4,160,940, the desired voltage modifications can be brought about indirectly by alterations of that input frequency.

The aforedescribed voltage-modifying steps can be carried out, in accordance with the structural aspects of my invention, by automatic control means for adjusting a variable impedance in circuit with the power line supplying the stator with an alternating input voltage, changes in the current flow of the power line being detected by monitoring means such as a voltage or current sensor working into a discriminator which distinguishes between increases and decreases in that current flow. The discriminator, coupled to the automatic control means, includes evaluation means programmed to cause the algebraic summation of a voltage increment with the RMS value of the input voltage in recurrent steps as described above, with reversal of the sign of the voltage increment upon detection of a resulting current increase. The variable impedance could be an adjustable transformer, as known per se from the aforementioned German published specification No. 28 17 163, or a potentiometer; in a system of the type described in my prior U.S. Pat. No. 4,160,940, in which the power line includes an a-c/d-c converter and a d-c/a-c converter inserted in cascade between an alternating-current supply and a multiphase connection extending to the stator, the variable impedance may be represented by a set of electronic switches such as thyristors forming part of one of these converters as disclosed in that prior patent.

Pursuant to a more particular feature of my invention, the discriminator interfacing with the monitoring means and the automatic control means further comprises a store for temporarily retaining an output signal of the monitoring means which is representative of a stator-current sample extracted from the power line, the evaluation means of the descriminator having inputs connected to the monitoring means and to the signal store for emitting respective voltage-changing commands to the control means whenever an instantaneous output signal differs from a preceding output signal, temporarily retained in that store, by an amount of either sign whose absolute magnitude surpasses a predetermined threshold. The store, which may be a read/write memory or the second stage of a two-stage shift register, may be connectable in an initial phase of a load-driving operation to a starting circuit entering therein a preliminary signal which simulates an extraordinarily high stator current. With the discriminator deactivated by the starting circuit in that initial phase, it will detect upon its reactivation an apparent current decrease since the actual current then sensed by the monitoring means will invariably be less (in absolute magnitude) than the stored simulated sample. A timer connected to the discriminator may emit thereto a series of activating pulses enabling a loading of the store by a new output signal of the monitoring means only after an interval sufficient to stabilize the input voltage following any adjustment of the variable impedance by the control means.

If the establishment of the current minimum requires only one-way incremention of the input voltage after an initial change in the opposite sense, as noted above, the discriminator may be replaced by a simple difference detector.

BRIEF DESCRIPTION OF THE DRAWING

The above and other features of my invention will now be described in detail with reference to the accompanying drawing in which:

FIG. 1 is a graph representing the power of an a-c motor as a function of a load driven thereby;

FIG. 2 is a so-called Heyland diagram showing the relationship of stator current and voltage in an induction motor for different voltage/frequency ratios;

FIG. 3 is a graph showing the relationship between stator current and supply voltage for different loads;

FIG. 11 shows details of a command generator included in the system of FIG. 4.

SPECIFIC DESCRIPTION

Figure 4:
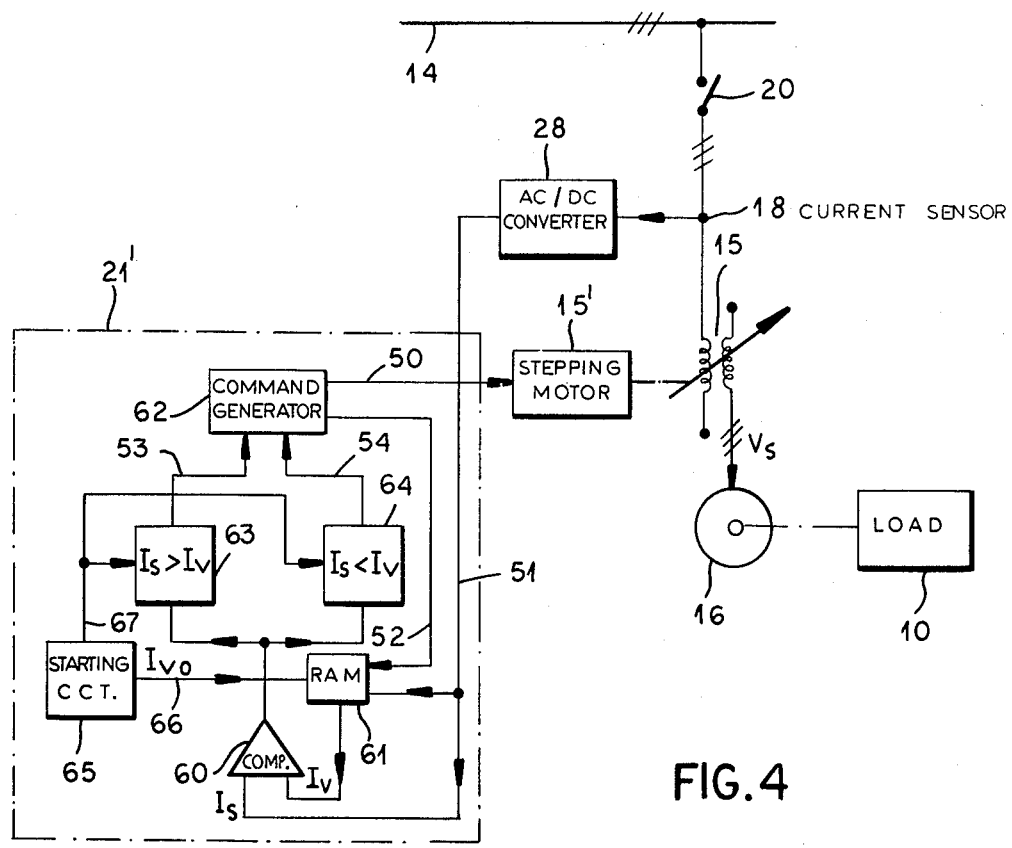
FIGS. 4–9 are block diagrams of several current-control systems embodying my invention.

In FIG. 1 I have plotted motor power P against time t for a progressively increasing load, such as a rotating cop on a spindle in textile machinery which is being wound up over a time period indicated by an arrow W. A horizontal line 11 shows the maximum power $P_{max}$ available from the motor or motors driving that load. As indicated by a curve 12, however, only a fraction of power $P_{max}$ is utilized until the end of the operation which is marked by a point X. The shaded area between lines 11 and 12 represents an operating phase during which energy can be saved by a lowering of the voltage/frequency ratio which may be termed an "electrical size reduction" of the motor or motors. This will be apparent from the two Heyland circles in the diagram of FIG. 2, showing different voltage/frequency ratios V/f and V'/f along with resulting stator currents $I_s$ and $I_s'$. The available torques M and M', given by the imaginary components of the respective stator currents, are identical in the two instances and thus correspond to a load of predetermined magnitude. The difference between the real components of currents $I_s$ and $I_s'$ represents a significant reduction of power in the case of the smaller circle.

In FIG. 3, where current $I_s$ has been plotted against voltage $V_s$ two curves 13a and 13b respectively relate to a larger and a smaller load driven by the same induction motor at a given rotor speed. It will be seen that the low points 9a and 9b of the two curves respectively correspond to a higher and to a lower input voltage $V_s$. As diagrammatically illustrated in my prior U.S. Pat. No. 4,160,940, the stator current $I_s$ splits into two components, namely an excitation current $I_\mu$ passing through a magnetizing inductance and a reflected rotor current $I_r$ traversing the rotor inductance and the apparent rotor resistance $R_r$. That resistance has a fixed component and a frequency-dependent component, causing the rotor resistance as seen by the stator current to vary generally inversely with slip frequency. Since input voltage $V_s$ is determined in part by the product $I_s$ times $R_r$, the lowering of that voltage corresponds to a rise in slip frequency. This means, in turn, that the driving frequency f must be higher at point 9b than at point 9a if rotor speed is to be held constant.

Curves similar to those of FIG. 3 can also be plotted for synchronous motors.

Reference will now be made to FIG. 4 showing a three-phase supply line 14 connectable through a master switch 20 to the primary winding of an adjustable transformer 15 whose secondary winding supplies a three-phase voltage $V_s$ to the stator terminals of an alternating-current motor 16 which in this instance may be of either the induction or the synchronous type and is coupled to a load 10. A current monitor, comprising a sensor schematically represented by a junction point 18 tied to an a-c/d-c converter 28, energizes an input lead 51 of a discriminator 21' including a comparator 60 and a random-access memory 61 with inputs connected to that lead. Comparator 60, which has another input tied to an output of memory 61, feeds two threshold circuits 63 and 64 in parallel. Output leads 53 and 54 of these threshold circuits extend to a command generator 62 adapted to step a servomotor 15', constituting a control means, through a connection 50; circuit 62 also has an output lead 52 terminating at memory 61. A starting circuit 65 within unit 21' has an output lead 66 extending to memory 61 and another lead 67 terminating at respective blocking inputs of threshold circuits 63 and 64.

Memory 61, when enabled by a command from generator 62 on lead 52, stores the output signal of converter 28 then appearing on lead 51 and also reads it out to comparator 60 as a sample $I_v$ of the stator current as measured at the time of the enabling command. When the instantaneous stator current $I_s$ differs from the stored value $I_v$, comparator 60 emits a signal proportional to that difference which is passed either by circuit 63 or by circuit 64, depending on its polarity, if its absolute magnitude surpasses the respective threshold. Command generator 62, responding to a signal on lead 53 or 54, then steps the servomotor 15' for an adjustment of transformer 15—acting as a variable-impedance means—to increment or decrement the stator voltage $V_s$ as more fully described hereinafter. Comparator 60 and memory 61 may both operate either digitally or in the analog mode. Components 60-64 represent circuitry discriminating between increases and decreases in the stator current drawn by motor 16.

Starting circuit 65 is activated, e.g. under the control of master switch 20, for a predetermined period following the commencement of the load drive. Aside from blocking the threshold circuits 63 and 64 during that period, circuit 65 also loads the memory 61 with a signal sample $I_{vo}$ simulating an extraordinarily large stator current. With leads 53 and 54 de-energized by the blocking action of circuit 65, memory 61 does not respond to the energization of lead 51.

In order to achieve a gradual acceleration of motor 16 during the start-up phase, the setting of transformer 15 should be such as to provide a relatively low supply voltage $V_s$ at that time, e.g. one lying about 100 V below that of the supply network represented by line 14. This could be done manually, or with suitable adjustment of servomotor 15' under the control of starting circuit 65. When the full voltage is applied to the transformer primary after the initial phase, with simultaneous unblocking of circuits 63 and 64, comparator 60 receives from lead 51 a signal $I_s$ of lower absolute magnitude than the simulated sample $I_{vo}$ previously written into memory 61. This causes conduction of threshold circuit 64 which triggers the command generator 62 into emitting on connection 50 a pulse stepping the servomotor 15' to modify the RMS value of voltage $V_s$ in one or the other sense; in the general case here considered, it matters little whether the voltage is increased or reduced at that point. At the same time, in response to an enabling signal on lead 52, memory 61 stores the value of the new current sample as a reference signal $I_v$.

If the voltage modification caused by the first stepping command on connection 50 leads to a decrease in the stator current, sufficient to let the output signal of comparator 60 overcome the threshold of circuit 64, generator 62 is triggered into emitting a similar stepping command in order to shift the operating point of the motor further toward the low point of a current curve such as those shown in FIG. 3. Depending on whether that modification is an increment or a decrement of the stator voltage, the operating point is assumed to lie to the left or to the right of the minimum on the current curve and to move progressively toward that minimum with consecutive steps of servomotor 15'. When the operating point comes to lie close to the minimum, a further incrementation or decrementation of voltage $V_s$ will have no measurable effect upon the current $I_s$ provided that each modifying step is small enough to avoid an overshooting of that minimum so that the operating point moves significantly uphill on the opposite branch of the curve. Such an uphill move could, however, occur when a load variation causes a changeover from one of the curves of FIG. 3 to the other, e.g. from point 9a to the right-hand branch of curve 13b in the event of a load reduction or from point 9b to the left-hand branch of a curve 13a in the event of a load increase. If the resulting signal difference $I_s - I_v$ overcomes the threshold of circuit 63, generator 62 is instructed by the energization of lead 53 to invert the sign of the next stepping command given to servomotor 15' in an effort to move the operating point closer to the new current minimum. Such a sign inversion will also occur if the voltage modification resulting from the first step of servomotor 15' leads to an increase rather than a decresae of the stator current.

Command generator 62 may have a structure shown in FIG. 11, comprising a flip-flop 90 with a switching input tied to lead 53 and with set and reset outputs respectively connected to first inputs of a pair of AND gates 91 and 92. Leads 53 and 54 are connected via an OR gate 93 to the second inputs of these AND gates whose output leads are wires 50' and 50" forming part of connection 50 (FIG. 4). Lead 52 also extends from the output of OR gate 93 which may operate with a certain delay enabling the completion of a switchover of flip-flop 90 before the unblocking of either AND gate. Thus, flip-flop 90 will not change its set or reset state if lead 54 is energized so that the previously conducting AND gate 91 or 92 is again unblocked to emit an identical stepping command. If, however, voltage appears on lead 53, the other AND gate will be unblocked by a switchover of the flip-flop to reverse the sense of displacement of servomotor 15'. The reloading of memory 61, FIG. 4, may be enabled by the leading edge of a voltage pulse appearing on lead 52.

In principle, therefore, it is immaterial whether the first step of servomotor 15' is in a voltage-incrementing or a voltage-decrementing direction since any "false" modification, i.e. an uphill shift on the current curve related to the load, will be immediately corrected. If, however, it is assumed that the load changes only undirectionally, the command generator 62 may be programmed to let the first adjustment step invariably modify the stator voltage in a sense tending to compensate for the anticipated load change, i.e. to increase that voltage if the load is expected to rise.

Unit 21' may also include a timer activating the comparator 60 only intermittently, e.g. as described hereinafter with reference to FIG. 9, in order to allow for a restabilization of the input voltage after every readjustment thereof before any reoperation of the control means represented by servomotor 15'. Such a temporary deactivation of the comparator will also delay a reloading of memory 61 during an instability interval.

Figure 5:
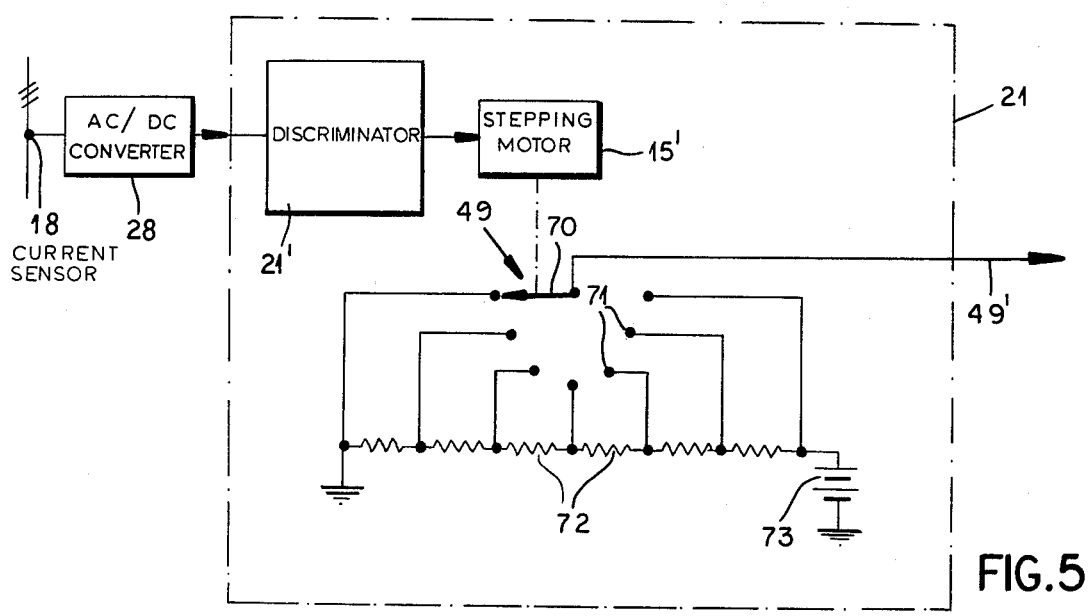
Figure 6:
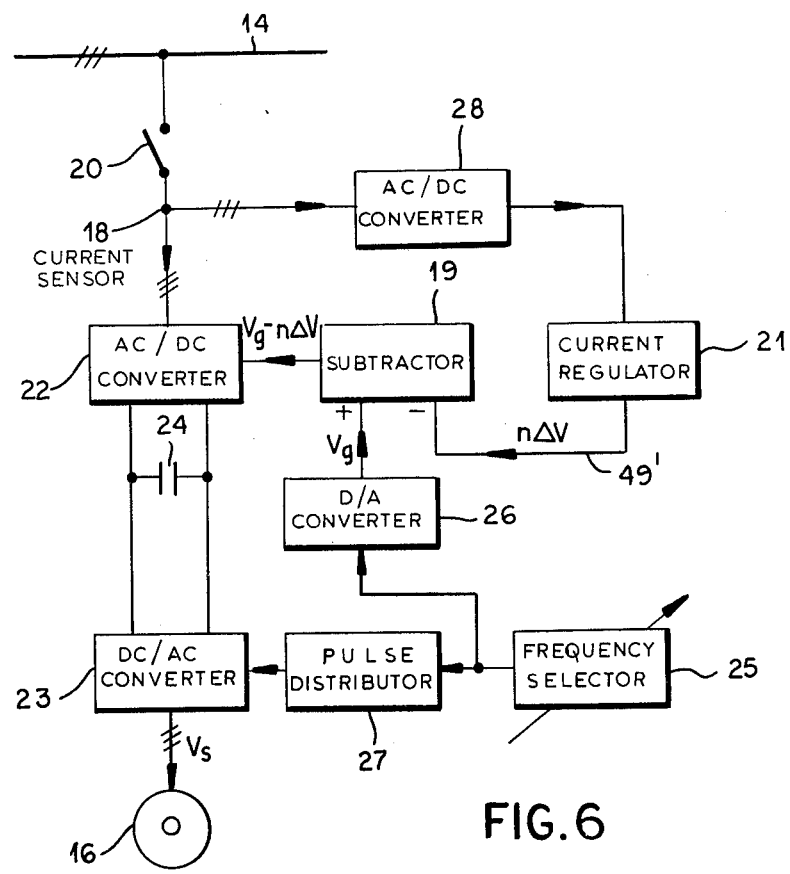
Figure 7:
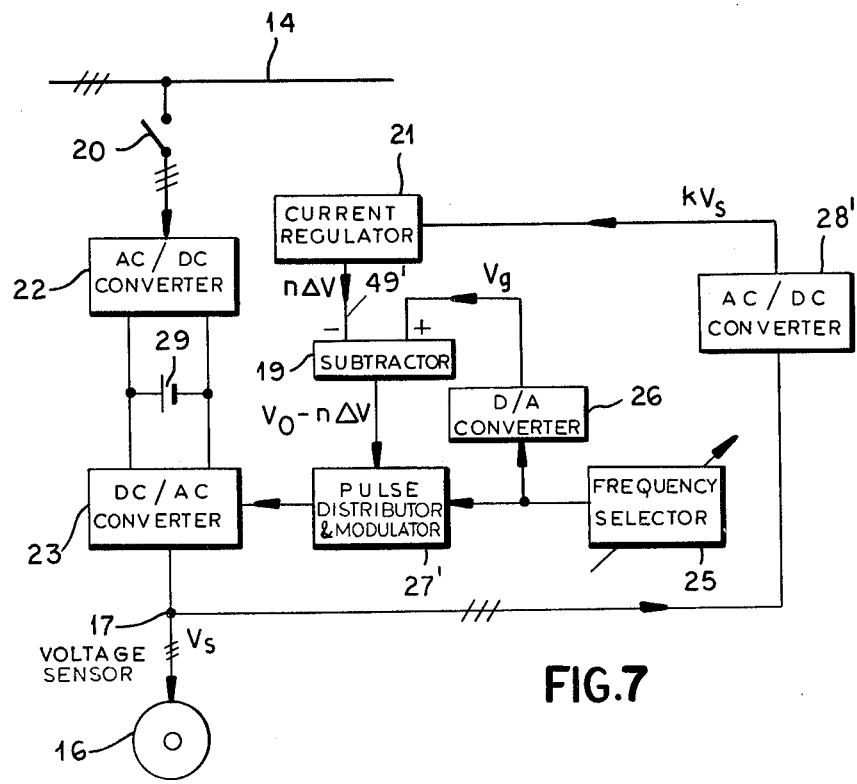
Figure 8:
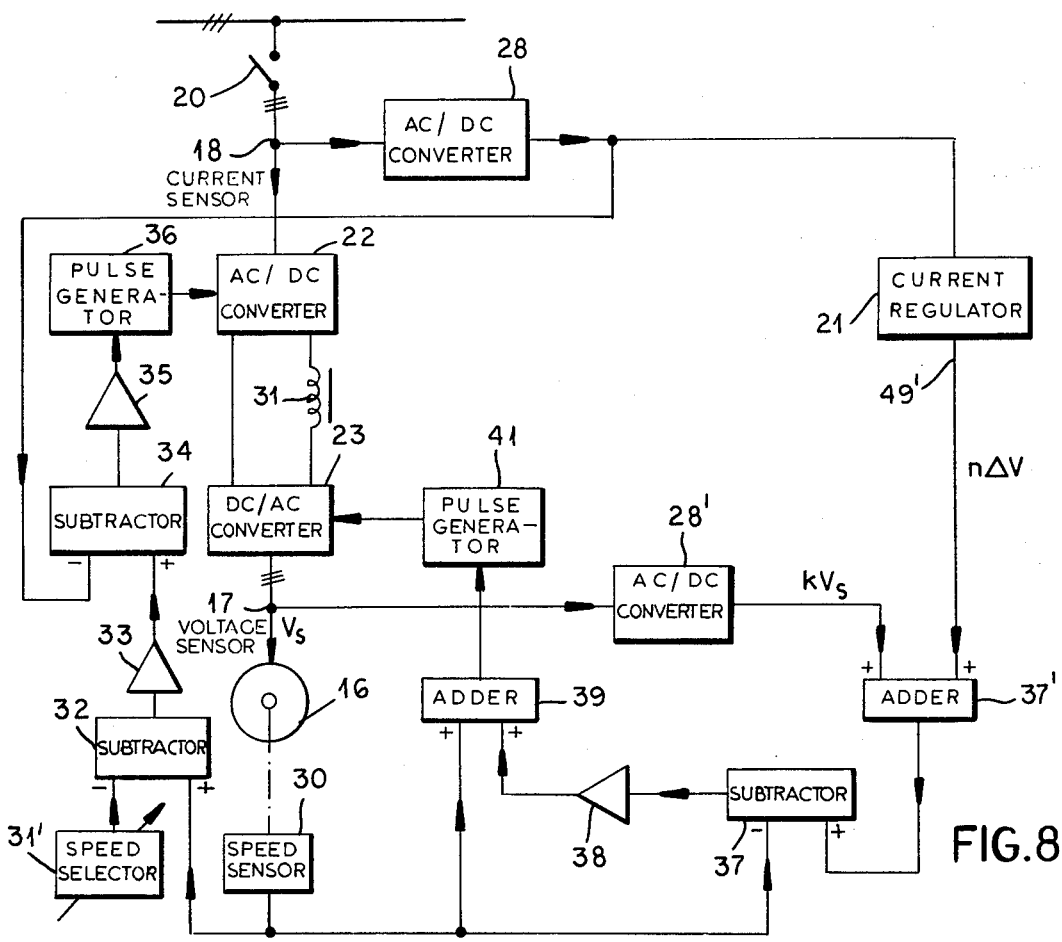

Transformer 15 is representative of a variety of variable-impedance means for modifying the input voltage $V_s$ in response to a signal from control means such as servomotor 15'. Thus, I have shown in FIG. 5 a current regulator 2 including the discriminator 21' and the servomotor 15' as two of its components, along with a potentiometer 49 formed by a series of resistors 72 having junctions connected to respective bank contacts 71 which are selectively engageable by a wiper 70 steppable by servomotor 15'. Resistors 72, which are preferably but not necessarily of identical size corresponding to uniform voltage increments $\Delta V$, are connected across a source of direct current schematically represented as a battery 73. Potentiometer 49 has an output lead 49', originating at its wiper 70, connected to the stator input of the controlled a-c motor for additively or subtractively supplementing its voltage $V_s$ with an increment $\pm \Delta V$ where n is an integer ranging between zero and the total number of resistors 72. FIG. 6–8, discussed hereinafter, show several possibilities of utilizing the potentiometer voltage for this purpose.

FIG. 6 shows a system in which motor 16 is energized by way of a frequency changer similar to that disclosed in my prior U.S. Pat. No. 4,160,940. This frequency changer comprises an a-c/d-c converter 22, connected to a branch of supply line 14 downstream of master switch 20 and current sensor 18, in cascade with a d-c/a-c converter 23 delivering the voltage $V_s$ on an output multiple connected to the stator of motor 16. The two converters are linked to each other by a direct-current path whose connectors are bridged by a capacitor 24 serving as a current-stabilizing reactance substantially equivalent to a series choke as shown in the prior patent and also at 31 in FIG. 8. A current regulator 21, as shown in FIG. 5, is connected via a-c/d-c converter 28 to current sensor 18 and delivers its output voltage $n\Delta V$ to the subtrahend input of a subtractor 19 whose minuend input receives a voltage $V_g$ by way of a digital/analog converter 26 from a manually settable digital frequency selector 25. Subtractor 19 emits a difference voltage $V_g - n\Delta V$ to converter 22 in order to change the magnitude of its output voltage transmitted to the complementary converter 23, as by varying the periods of conductivity of a set of thyristors of converter 22 in the manner described in my prior U.S. Pat. No. 4,160,940. Independently thereof, the output signal of frequency selector 25 is fed to a pulse distributor 27 controlling the conduction of thyristors in d-c/a-c converter 23, again as described in my prior patent, to establish a desired rotary speed for the stator field of motor 16.

If, after the start-up period, the potentiometer 49 (FIG. 5) of current regulator 21 is so positioned that the voltage on lead 49' is zero, motor 16 will at first be driven with maximum power. This means that the operating point lies to the right of the current minimum on a curve such as those shown in FIG. 3. The operation of command generator 62 described with reference to FIG. 4 will progressively increase the value of output voltage $n\Delta V$ of the current regulator so as to diminish the control voltage fed to converter 22, with resulting decrease of stator voltage $V_s$ until the current minimum has been substantially reached in the manner already explained.

A modification of the system of FIG. 6, illustrated in FIG. 7, includes a monitoring junction 17 provided in the input multiple of motor 16 to sense its stator voltage $V_s$. That voltage, varying with the stator current, gives rise to a proportional signal $kV_s$ fed via an a-c/d-c converter 28' to current regulator 21 which again emits on its output lead 49' an incremental voltage $n\Delta V$ to the subtracted input of a subtractor 19. The latter, as before, receives a frequency-proportional voltage $V_g$ from a selector 25 working into a pulse distributor 27'. This pulse distributor, in contrast to the one shown at 27 in FIG. 6, also operates as a pulse-width modulator by alternately triggering and quenching the thyristors of d-c/a-c converter 23 (see U.S. Pat. No. 4,160,940) to vary the mean amperage of the stator current for the purpose of minimizing same as described above.

As further shown in FIG. 7, the shunt capacitor 24 connected across the d-c link between converters 22 and 23 may be replaced by the capacitance of an accumulator 29 also serving as a standby power supply in the event of failure of the utility network represented by line 14. Capacitor 24, accumulator 29 and the choke 31 of FIG. 8 may, of course, be used interchangeably in these three Figures.

The circuitry of FIG. 8 includes additional features disclosed in my prior U.S. Pat. No. 4,160,940, among them a speed sensor or tachometer 30 coupled with the rotor of motor 16 which in this instance is an induction motor preferably of the squirrel-cage type. In order to maintain a desired rotor speed, a selector 31' works into one input of a subtractor 32 whose other input receives the output signal of tachometer 30 so as to generate an error signal delivered via an amplifier 33 to the minuend input of another subtractor 34. An a-c/d-c converter 28, connected as in FIG. 6 to a current sensor 18 upstream of converter 22, feeds its output signal on the one hand to the aforedescribed current regulator 21 and on the other hand to the subtrahend input of subtractor 34 which emits a corrective signal by way of an amplifier 35 to a control input of a pulse generator 36. The a-c/d-c converter 22 of the frequency changer in the supply line of motor 16 is controlled by pulse generator 36 in the manner taught in my prior patent where the counterparts of present components 33 and 35 are shown as operational amplifiers. Thus, components 32–36 constitute a feedback circuit of relatively large time constant responding with a certain lag to deviations of the rotor speed from the selected value. A fast feedback is established, again as in the prior patent, by a connection from the output of tachometer 30 via an adder 39 to a pulse generator 41 controlling the operation of d-c/a-c converter 23, adder 39 having another input connected by way of an amplifier 38 to the output of a subtractor 37 whose subtrahend input receives the output signal of tachometer 30, preferably through a nonillustrated voltage limiter. A signal $kV_s$ proportional to the stator voltage of motor 16, again emitted by an a-c/d-c converter 28' tied to a voltage sensor 17 downstream of d-c/a-c converter 23, is fed to the minuend input of subtractor 37 via a further adder 37' which also receives the voltage increment $n\Delta V$ from output lead 49' of current regulator 21. The input connections of subtractor 37 and adder 39 may be provided, like those of their counterparts in U.S. Pat. No. 4,160,940, with adjustable series resistances that have not been illustrated. If amplifier 38 acts as an inverter, the signs at the inputs of subtractor 37 will of course have to be interchanged.

As long as current regulator 21 has no output, i.e. with n=0, the system of FIG. 8 operates in a manner essentially identical with that of my prior patent. If, however, lead 49' is energized under the conditions described above, its incremental voltage $n\Delta V$ supplements the output voltage $kV_s$ of converter 28' in the feedback circuit including pulse generator 41 so as to simulate a stator voltage $V_s$ differing from that detected by sensor 17. Since this feedback circuit controls the input frequency of motor 16, the modification of that frequency by the incremental voltage $n\Delta V$ affects the slip existing after the re-establishment of the rotor speed by the "slow" feedback loop 32–36 and thus changes the input voltage $V_s$ under steady-state conditions to minimize the current consumption of motor 16.

Figure 9:
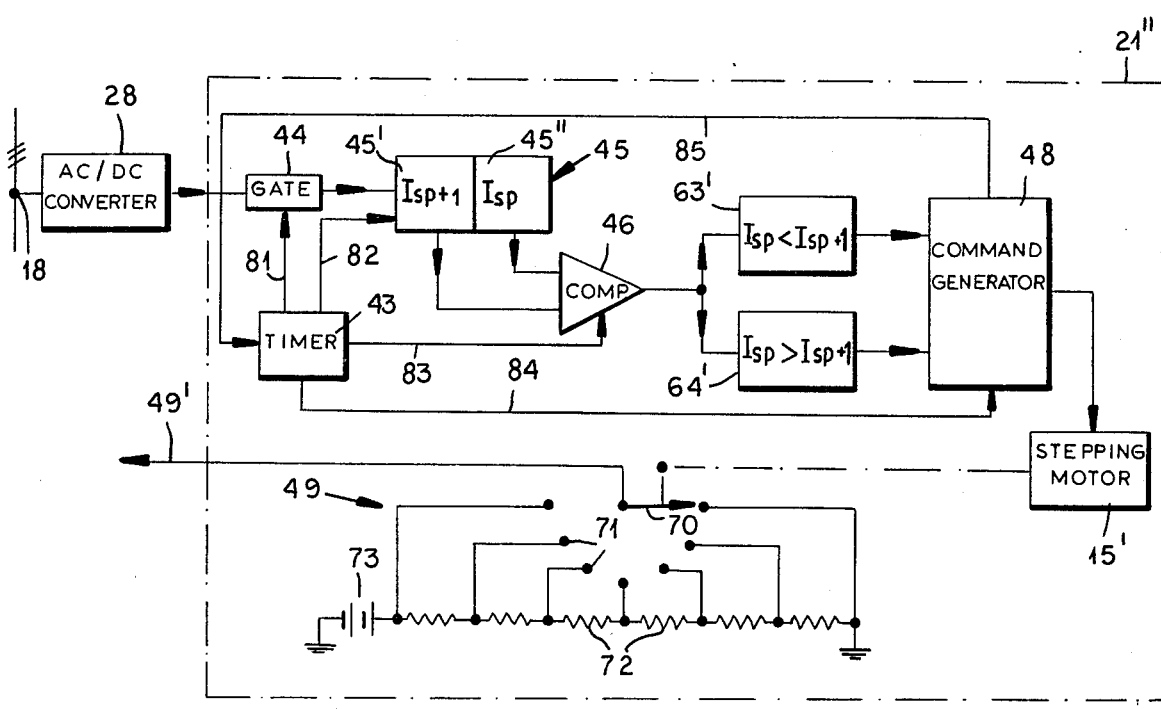

In FIG. 9 I have shown a somewhat different current regulator 21" which may be substituted for the regulator 21 in the systems of FIGS. 6–8. The discriminating circuitry of regulator 21" is generally similar to unit 21' (FIG. 4) in that it comprises storage means 45, designed as a two-stage shift register, working into a comparator 46 whose output is connected in parallel to two threshold circuits 63', 64" working into a command generator 48. A first stage 45' of shift register 45 is connected via a gate 44 to the output of a-c/d-c converter 28 (or 28' in a system such as that of FIG. 7) to receive therefrom an instantaneous current sample whenever that gate is unblocked by an activating clock pulse appearing on an output lead 81 of a timer 43; one input of comparator 46 is virtually connected to monitoring means 18, 28 by way of gate 44 and stage 45'. Another output lead 82 of that timer delivers shifting commands to register 45 whose second stage 45" thus contains a current sample $I_{sp}$ while stage 45' is loaded with a sample $I_{sp+1}$ extracted in the immediately following pulse period. Comparator 46, when enabled by a pulse on an output lead 83 of timer 43, responds to a possible disparity between the contents of stages 45' and 45" so that circuit 63' or 64" conducts if its threshold is exceeded by a difference $I_{sp}<I_{sp+1}$ or $I_{sp}>I_{sp+1}$, respectively. Command generator 48, which may be similar to generator 62 described with reference to FIGS. 4 and 11, then steps an associated servomotor 15' to change the position of a potentiometer 49 with output lead 49' whose structure conforms to that of FIG. 5. Regulator 21" may also include a nonillustrated starting circuit, such as that shown at 65 in FIG. 4, which inhibits the timer 43 in an initial phase while substantially lowering the supply voltage of the associated motor (e.g. with the aid of potentiometer 49) for a gradual start-up as described above. At the end of the start-up phase, potentiometer 49 is returned to or held in its illustrated zero-voltage position while a pulse on an output lead 84 of timer 43 instructs the command generator 48 to step the servomotor 15' even as gate 44 is unblocked by a first clock pulse on lead 81 to load the register stage 45' whose previous contents have been shifted to stage 45". Comparator 46 is enabled immediately thereafter to detect the difference in the contents of the two register stages, with consequent stepping of servomotor 15' in one direction or the other as already described.

Command generator 48 may inform the timer 43, via a signal on a lead 85, that a current minimum has been achieved since the last step of servomotor 15' has not yielded an output from either threshold circuit 63', 64'. Timer 43 may then halt all further operations for a predetermined period, e.g. of several minutes, and thereafter start a new sequence by re-energizing its output lead 84 to determine whether an intervening change in load requires another adjustment of potentiometer 49. The new sequence could be preceded by a resetting of the potentiometer to zero or to some other position so chosen that the operating point will lie with certainty to the right of the current minimum as viewed on a curve such as those of FIG. 3. This will allow the operation to be invariably restarted with a decrementation of the supply voltage.

Alternatively, timer 43 may keep the current regulator 21" operative without interruption to modify the supply voltage in response to any significant load change.

Figure 10A:
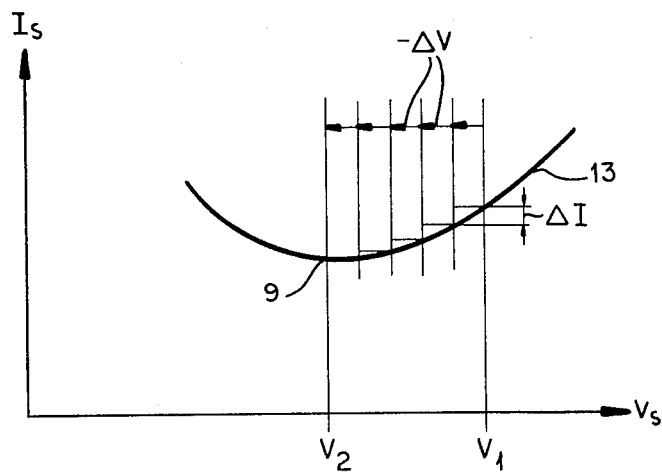
FIGS. 10a, 10b and 10c are graphs helping to explain the mode of operation of such a system.
Figure 10B:
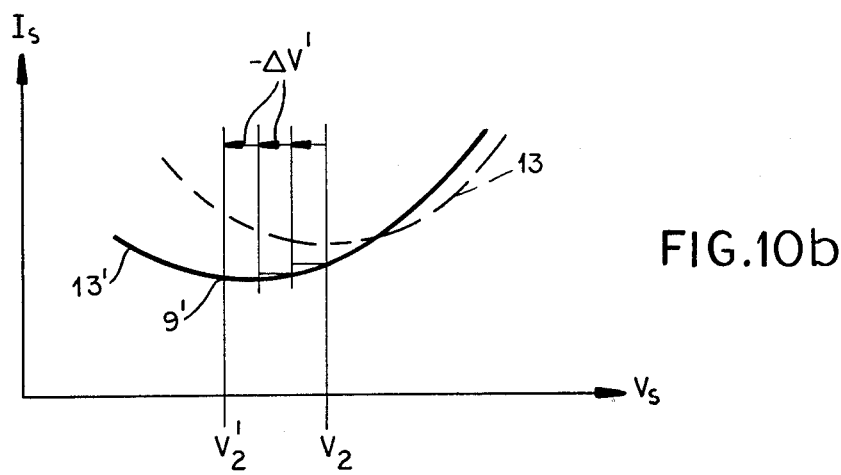
Figure 10C:
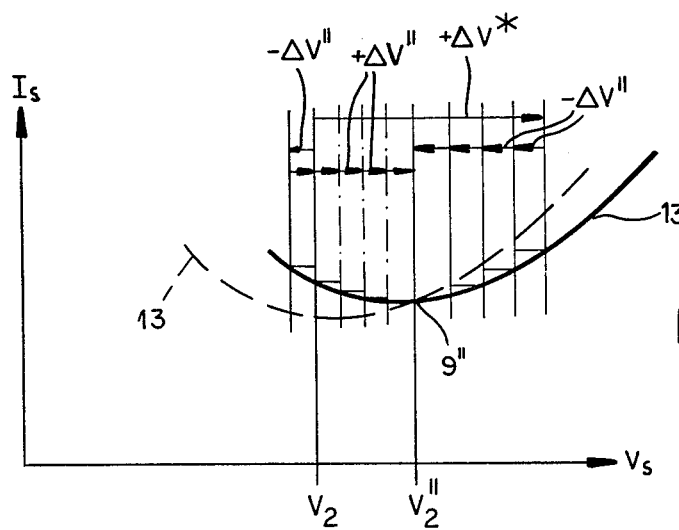

By way of further illustration of the method according to my invention, I have shown in FIGS. 10a–10c three curves 13, 13' and 13", similar to those of FIG. 3, by which current $I_s$ has been plotted against voltage $V_s$ for different loads. In FIG. 10a, which relates to a medium load, a starting voltage $V_1$ determines an operating point well to the right of current minimum 9. With consecutive voltage reductions by a decrement or negative increment $-\Delta V$, an input voltage $V_2$ is reached at which the current $I_s$ lies at or close to its minimum 9. It will be noted that the current drops by successively smaller steps $\Delta I$ and that the last voltage decrementation results in virtually no current change. The voltage increment $\Delta V$ may range, for example, between 1 and 3% of the maximum supply voltage.

In FIG. 10b it has been assumed that a decrease in load shifts the current minimum to a point 9' on curve 13'. At the same time, the current actually drawn by the controlled motor at voltage $V_2$ has dropped to a value lower than the previous minimum 9 so that the discriminator 21' of FIG. 4 or its counterpart in FIG. 9 detects a disparity between a stored and a new sample giving rise to a new series of decrementation steps $-\Delta V'$ until the altered minimum 9' has been attained.

FIG. 10c relates to the situation where, with the supply voltage still at $V_2$ to establish the original current minimum, the load rises and the current assumes a value higher than that previously stored. This could at first result in a decrementation of the voltage by a step $-\Delta V'''$ causing an uphill shift of the operating point. Reverse-incrementation of voltage $V_s$ in a series of fractional unit steps $+\Delta V'''$ leads to the current minimum at 9'' corresponding to a voltage $V_2''$. Alternatively, the detection of a current change at voltage $V_2$ may give rise to a large jump of voltage $V_s$ by an increment $+\Delta V^*$ again entailing an unphill shift of the operating point, this resulting in another inversion whereby the supply voltage is reduced in a number of unit steps $-\Delta V'''$ to the value $V_2''$.

The last-mentioned mode of operation can be brought about by a resetting of potentiometer 49 upon every resumption of current monitoring by timer 43 as described above with reference to FIG. 9. In that instance, and especially where the load is expected to vary in one sense only, components 46, 63', 64' of FIG. 9 can be replaced by a single threshold comparator triggering the associated command generator 48 whenever the signal difference at the inputs of that comparator exceeds a certain absolute magnitude, with resulting unidirectional stepping of servomotor 15' after an initial reverse adjustment of the supply voltage by a jump equaling a multiplicity of unit steps as shown at $+\Delta V^*$. As long as no overshooting of minimum 9'' occurs, the comparator need only determine whether or not the ratio of current change $\Delta I$ to voltage change $\Delta V$ has an absolute magnitude at least equal to its threshold; with identical unit increments $\Delta V$ that ratio is proportional to the current drop $\Delta I$. If point 9'' is traversed for any reason, the ensuing rise in current $I_s$ will eventually result in a current change surpassing another threshold of the comparator which thereupon may initiate a new voltage jump $+\Delta V^*$ followed by corrective decrementation in steps $-\Delta V'''$. Thus, the mode of operation just described is not necessarily limited to a situation in which the load changes only unidirectionally; in the case of a load reduction as discussed with reference to FIG. 10b, for example, a detected current drop at voltage $V_2$ could also give rise to an initial rightward voltage jump followed by fractional decremental shifts to the left. The aforedescribed circuitry discriminating between upward and downward current changes, however, generally achieves the desired current minimization more rapidly.

It should be noted that the potentiometer 49 of FIGS. 5 and 9, acting as a source of analog voltage increments, could be replaced by a source of digital increments such as a read-only memory with cells selectively addressable under the control of command generator 62 or 48.

I claim:

1. A method of minimizing current consumption of an electric motor having a stator connected across a supply circuit and a rotor entrained by a rotating electromagnetic field generated in response to an alternating input voltage in said stator, said rotor being connected to a variable load, comprising the steps of:
   (a) modifying the RMS value of said input voltage by algebraically summing therewith a voltage increment of a given sign;
   (b) detecting a resulting current change in said supply circuit and determining the direction of the detected change;
   (c) upon detecting an increased current in step (b), modifying the RMS value of said input voltage by algebraically summing therewith a voltage increment of a sign opposite that of step (a);
   (d) upon detecting a decreased current due to a voltage modification according to one of steps (a) and (c), continuing the modification of said RMS value by algebraic summation therewith of at lease one further voltage increment of the sign yielding the decreased current until the magnitude of the current diminishing in response thereto has substantially leveled off; and
   (e) repeating from time to time a sequence of operations including at least steps (a), (b) and (d).

2. A method as defined in claim 1 wherein the sequence of operations according to step (e) is periodically initiated.

3. A method as defined in claim 1 wherein the sequence of operations according to step (e) is initiated upon detection of any current change due to a significant load variation.

4. A method as defined in claim 3 wherein the load is normally variable in a predetermined sense only, the sign of said voltage increment in step (a) being so chosen as to cause a current change compensating the expected load variation.

5. A method as defined in claim 1 wherein said motor is of the induction type in which load variations affect a slip of the rotor speed relative to the rotating electromagnetic field and said rotor speed is controlled by slip-modifying frequency adjustments of said alternating input voltage, the voltage modifications of steps (a), (c), (d) and (e) being brought about by alterations of the frequency of said input voltage.

6. A system of minimizing current consumption of an electric motor having a stator connected across a power line and a rotor entrained by a rotating electromagnetic field generated in response to an alternating input voltage in said stator, said rotor being connected to a variable load, comprising:
   monitoring means coupled to said power line for detecting changes in the magnitude of the current flowing therethrough;
   variable-impedance means in circuit with said power line for modifying the RMS value of said input voltage;
   discriminating means connected to said monitoring means for distinguishing between increases and decreases in said magnitude; and
   automatic control means coupled to said discriminating means for adjusting said variable-impedance means, said discriminating means including evaluation means programmed to cause algebraic summation of a voltage increment of a given sign with said RMS value in recurrent steps and to reverse the sign of said voltage increment upon detection of a resulting current increase until the current drawn by said stator diminished by a preceding algebraic summation fails to change significantly in response to a further algebraic summation.

7. A system as defined in claim 6 wherein said variable-impedance means comprises an adjustable transformer in series with said stator.

8. A system as defined in claim 6 wherein said variable-impedance means comprises a potentiometer having a wiper coupled to said power supply through an algebraic adder.

9. A system as defined in claim 6 wherein said discriminating means further comprises a store for temporarily retaining an output signal of said monitoring means representative of a stator-current sample extracted from said power line, said evaluation means having input connections to said monitoring means and to said store for emitting respective voltage-changing commands to said control means upon an instantaneous output signal differing from a temporarily retained preceding output signal by an amount of either sign whose absolute magnitude surpasses a predetermined threshold.

10. A system as defined in claim 9, further comprising a starting circuit connectable to said store in an initial phase of a load-driving operation to enter therein a preliminary signal simulating an extraordinary high stator current, said discriminating means being deactivated by said starting circuit in said initial phase.

11. A system as defined in claim 9, further comprising timing means connected to said discriminating means for emitting thereto a series of activating pulses enabling a reloading of said store by a new output signal of said monitoring means only after an interval sufficient to stabilize said input voltage after any adjustment of said variable-impedance means.

12. A system as defined in claim 11 wherein said timing means is programmed to halt the emission of said series of activating pulses for a predetermined period in response to a stop signal from said evaluation means indicating a leveling-off of the stator current at substantially a minimum value.

13. A system as defined in claim 6 wherein said power line includes an alternating-current supply feeding an a-c/d-c converter, a d-c/a-c converter connected to said a-c/d-c converter, and a multiphase connection extending from said d-c/a-c converter to said stator, said variable-impedance means comprising electronic switch means included in one of said converters.

14. A system as defined in claim 13 wherein said electronic switch means is part of said a-c/d-c converter, said monitoring means comprising a current sensor coupled to said power line upstream of said a-c/d-c converter.

15. A system as defined in claim 13 wherein said electronic switch means is part of said d-c/a-c converter, said control means including a source of trigger pulses connected to said switch means for establishing a selected frequency for said alternating input voltage.

16. A system as defined in claim 15, further comprising a current-stabilizing reactance inserted in said power line between said converters.

17. A system as defined in claim 16 wherein said reactance is the capacitance of a storage battery connected as an emergency power supply for said d-c/a-c converter across a direct-current path linking said converters with each other.

18. A system as defined in claim 15 wherein said source is operable to modulate the width of said trigger pulses in response to said voltage-changing commands.

19. A system as defined in claim 15 wherein said motor is of the induction type in which load variations affect a slip of the rotor speed relative to the rotating electromagnetic field, further comprising a tachometer coupled with said rotor and feedback means connecting said tachometer to said source of trigger pulses for varying the frequency of said input voltage to modify changes in said slip due to load variations, said control means including algebraic summing means in said feedback means for superimposing said voltage increments upon an output voltage of said tachometer.

20. A system as defined in claim 19 wherein said monitoring means comprises a voltage sensor coupled to said power line downstream of said d-c/a-c converter.

21. A method of minimizing current consumption of an electric motor having a stator connected across a supply circuit and a rotor entrained by a rotating electromagnetic field generated in response to an alternating input voltage in said stator, said rotor being connected to a variable load,
comprising the steps of:
(a) establishing the RMS value of said input voltage at an initial level high enough to generate in said supply circuit a current greater than a minimum consistent with load;
(b) progressively reducing said RMS value with concurrent measurement of the magnitude of said current;
(c) noting a decrease in said magnitude due to the reduction of said RMS value;
(d) determining whether the ratio of current decrease to voltage reduction remains above a predetermined threshold;
(e) terminating the reduction of said RMS value upon said ratio dropping below said threshold; and
(f) repeating steps (a) through (e) from time to time.

22. A method as defined in claim 21 wherein the reduction of said RMS value in step (b) proceeds in successive fractional voltage decrementations accompanied by a sampling of the resulting current, the determination of the ratio in step (d) involving a comparison of consecutive current samples.

23. A system for minimizing current consumption of an electric motor having a stator connected across a power line and a rotor entrained by a rotating electromagnetic field generated in response to an alternating input voltage in said stator, said rotor being connected to a variable load, comprising:
monitoring means coupled to said power line for detecting changes in the magnitude of the current flowing therethrough;
variable-impedance means in circuit with said power line for modifying the RMS value of said input voltage;
detector means connected to said monitoring means for ascertaining significant changes in said magnitude; and
automatic control means coupled to said detector means for adjusting said variable-impedance means, said control means being programmed to establish the RMS value of said input voltage from time to time at an initial level high enough to raise the magnitude of said current above a minimum consistent with load with subsequent progressive decrementation of said RMS value, said detector means including circuitry delivering to said control means a stop signal halting the reduction of said RMS value upon the ratio of current change to voltage reduction dropping below a predetermined threshold.

24. A system as defined in claim 23 wherein said circuitry comprises storage means for temporarily retaining current samples obtained from said monitoring means after predetermined voltage-decrementing steps taken by said control means, said circuitry further comprising comparison means connected to said storage means and to said monitoring means for discovering a current change due to a voltage-decrementing step.

* * * * *